US012750169B2

(12) United States Patent
Lin

(10) Patent No.: US 12,750,169 B2
(45) Date of Patent: Sep. 29, 2026

(54) APPARATUS AND METHOD OF COMMUNICATION OF SAME

(71) Applicant: GUANGDONG OPPO MOBILE TELECOMMUNICATIONS CORP., LTD., Dongguan (CN)

(72) Inventor: Hao Lin, Neuilly sur Seine (FR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 770 days.

(21) Appl. No.: 17/885,508

(22) Filed: Aug. 10, 2022

(65) Prior Publication Data

US 2022/0385417 A1 Dec. 1, 2022

Related U.S. Application Data

(63) Continuation of application No. PCT/IB2020/000485, filed on Mar. 30, 2020.

(51) Int. Cl.
*H04L 5/00* (2006.01)
*H04W 72/0446* (2023.01)
*H04W 72/21* (2023.01)

(52) U.S. Cl.
CPC .......... *H04L 5/0007* (2013.01); *H04L 5/0044* (2013.01); *H04W 72/0446* (2013.01); *H04W 72/21* (2023.01)

(58) Field of Classification Search
CPC ... H04L 5/0007; H04L 5/0044; H04L 5/0048; H04L 5/005; H04L 5/0094; H04L 5/0053; H04W 72/0446; H04W 72/21
See application file for complete search history.

(56) References Cited

U.S. PATENT DOCUMENTS

2018/0324789 A1 11/2018 Park et al.
2019/0045533 A1 2/2019 Chatterjee et al.
(Continued)

FOREIGN PATENT DOCUMENTS

CN 102907035 A 1/2013
CN 107078840 A 8/2017
(Continued)

OTHER PUBLICATIONS

International Search Report (ISR) dated Dec. 18, 2020 for Application No. PCT/IB2020/000485.
(Continued)

*Primary Examiner* — Chuong M Nguyen
(74) *Attorney, Agent, or Firm* — Ladas & Parry, LLP

(57) ABSTRACT

An apparatus and a method of communication of the same are provided. A method of communication of a user equipment (UE) includes being configured, by a base station, to receive a downlink transmission on a set of symbols in a slot and a set of resource blocks (RBs) and receiving the configured downlink transmission on the set of symbols in the slot and on the set of RBs, or otherwise canceling reception of the configured downlink transmission on the set of symbols in the slot and on the set of RBs. This can solve issues in the prior art and provide a method of receiving a configured downlink transmission on a set of symbols in a slot and a set of resource blocks (RBs) or otherwise canceling reception of the configured downlink transmission on the set of symbols in the slot and on the set of RBs.

12 Claims, 5 Drawing Sheets

(56) References Cited

U.S. PATENT DOCUMENTS

| | | | |
|---|---|---|---|
| 2019/0191453 A1 | 6/2019 | Xiong et al. | |
| 2020/0045696 A1* | 2/2020 | Huang | H04L 27/0006 |
| 2020/0053728 A1 | 2/2020 | Huang et al. | |
| 2020/0305183 A1* | 9/2020 | Papasakellariou | H04L 1/0003 |
| 2021/0051672 A1* | 2/2021 | Rastegardoost | H04W 72/0446 |
| 2022/0338238 A1* | 10/2022 | Wu | H04W 72/23 |

FOREIGN PATENT DOCUMENTS

| | | |
|---|---|---|
| CN | 107852287 A | 3/2018 |
| CN | 107852291 A | 3/2018 |
| CN | 109474403 A | 3/2019 |
| CN | 110034889 A | 7/2019 |
| CN | 110419186 A | 11/2019 |
| WO | 2019194624 A1 | 10/2019 |
| WO | 2020032700 A1 | 2/2020 |
| WO | 2021198722 A1 | 10/2021 |

OTHER PUBLICATIONS

Written Opinion (WOSA) dated Dec. 18, 2020 for Application No. PCT/IB2020/000485.

The first Office Action of corresponding European patent application No. 20753406.6, dated May 28, 2024.

The first Office Action and search report of corresponding Chinese patent application No. 202310109625.0, dated May 27, 2024.

The Notice of Allowance of corresponding Chinese patent application No. 202310109625.0, dated Aug. 1, 2024.

Liang Zhou et al., "Distributed Wireless Video Scheduling With Delayed Control Information", IEEE, Dec. 31, 2014, 13 pages.

Jiang Yanan, "Design and Implementation of Physical Layer Control for UE in 5G System", China excellent master's dissertation full text database, Jun. 2, 2019.

* cited by examiner

APPARATUS AND METHOD OF COMMUNICATION OF SAME

CROSS-REFERENCE TO RELATED APPLICATION

This application is a continuation of International Application No. PCT/IB2020/000485, filed on Mar. 30, 2020, the content of which is incorporated herein by reference in its entirety.

TECHNICAL FIELD

The present disclosure relates to the field of communication systems, and more particularly, to an apparatus and a method of communication of the same, which can provide a good communication performance and high reliability.

BACKGROUND

In an unlicensed band, an unlicensed spectrum is a shared spectrum. Communication equipments in different communication systems can use the unlicensed spectrum as long as the unlicensed meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum. For example, a communication device follows a listen before talk (LBT) procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT).

On an unlicensed carrier, for a channel occupation time obtained by a base station, it may share the channel occupation time to a user equipment (UE) for transmitting an uplink signal or an uplink channel. In other words, when the base station shares its own channel occupancy time with the UE, the UE can use an LBT mode with higher priority than that used by the UE itself to obtain the channel, thereby obtaining the channel with greater probability.

In new radio-based access to unlicensed spectrum (NRU), a wideband operation can be configured and a configured active bandwidth part (BWP) can include resource block sets (RB sets). In addition, in an NRU wideband operation, a base station (BS) (such as gNB) and a UE can operate in a wider band including RB sets. NR release 15 has defined a BWP concept, thus in a context of the NRU wideband operation, the UE can be configured with an active BWP including multiple RB sets. Multiple RB sets can be assigned by the gNB to the UE for uplink transmission, e.g. a physical uplink control channel (PUCCH) transmission. However, by regulation, priori to each transmission in the spectrum, a sender needs to perform the LBT procedure. This implies that for transmissions of multiple RB sets, multi-RB set-based LBT has to be performed.

Further, in release 16, if a UE is configured, by a base station, to receive a downlink transmission, the UE does not know if the base station will actually realize the configured downlink transmission and the UE needs to receive the configured downlink transmission, or the base station will cancel the configured downlink transmission, due for example prioritizing the configured resources for other service, thus the UE needs to cancel reception of the configured downlink transmission. How to provide a method to confirm the reception of the configured downlink transmission or in what condition the confirmation can be reached is still an open issue. In addition, how to provide a method of cancelling reception of the configured downlink transmission by the UE if a condition is not met is still an open issue.

Therefore, there is a need for an apparatus and a method of communication of the same, which can solve issues in the prior art and provide a method of receiving a configured downlink transmission by a user equipment (UE) if a condition is met.

SUMMARY

An object of the present disclosure is to propose an apparatus such as a user equipment (UE) and a method of communication of the same, which can solve issues in the prior art and provide a method of receiving a configured downlink transmission by a user equipment (UE) if a condition is met.

In a first aspect of the present disclosure, a method of communication of a user equipment (UE) includes being configured, by a base station, to receive a downlink transmission on a set of symbols in a slot and a set of resource blocks (RBs) and receiving the configured downlink transmission on the set of symbols in the slot and on the set of RBs, or otherwise canceling reception of the configured downlink transmission on the set of symbols in the slot and on the set of RBs.

In a second aspect of the present disclosure, a UE includes a memory, a transceiver, and a processor coupled to the memory and the transceiver. The transceiver is configured, by a base station, to receive a downlink transmission on a set of symbols in a slot and a set of resource blocks (RBs) and the transceiver is configured to receive the configured downlink transmission on the set of symbols in the slot and on the set of RBs, or otherwise to cancel reception of the configured downlink transmission on the set of symbols in the slot and on the set of RBs.

In a third aspect of the present disclosure, a non-transitory machine-readable storage medium has stored thereon instructions that, when executed by a computer, cause the computer to perform the above method.

In a fourth aspect of the present disclosure, a chip includes a processor, configured to call and run a computer program stored in a memory, to cause a device in which the chip is installed to execute the above method.

In a fifth aspect of the present disclosure, a computer readable storage medium, in which a computer program is stored, causes a computer to execute the above method.

In a sixth aspect of the present disclosure, a computer program product includes a computer program, and the computer program causes a computer to execute the above method.

In a seventh aspect of the present disclosure, a computer program causes a computer to execute the above method.

BRIEF DESCRIPTION OF DRAWINGS

In order to more clearly illustrate the embodiments of the present disclosure or related art, the following figures will be briefly described in the embodiments. It is obvious that the drawings are merely some embodiments of the present disclosure, a person having ordinary skill in this field can obtain other figures according to these figures without paying the premise.

DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In release 16, if a UE is configured, by a base station, to receive a downlink transmission, the UE does not know if the base station will actually realize the configured downlink transmission and the UE needs to receive the configured downlink transmission, or the base station will cancel the configured downlink transmission, due for example prioritizing the configured resources for other service, thus the UE needs to cancel reception of the configured downlink transmission. How to provide a method to confirm the reception of the configured downlink transmission or in what condition the confirmation can be reached is still an open issue. In addition, how to provide a method of cancelling reception of the configured downlink transmission by the UE if a condition is not met is still an open issue. Some embodiments of the present disclosure can solve issues in the prior art, provide a method of receiving a configured downlink transmission by a UE if a condition is met, and further provide a method of canceling reception of the configured downlink transmission by the UE if a condition is not met. In details, in some embodiments, if a UE is configured to receive a downlink transmission, the UE knows in what case, the configured downlink transmission is valid, so that the UE receives the configured downlink transmission. In some embodiments, if a UE is configured to receive a downlink transmission, the UE knows in what other case, the configured downlink transmission is invalid, so that the UE cancels reception of the configured downlink transmission.

Figure 1:
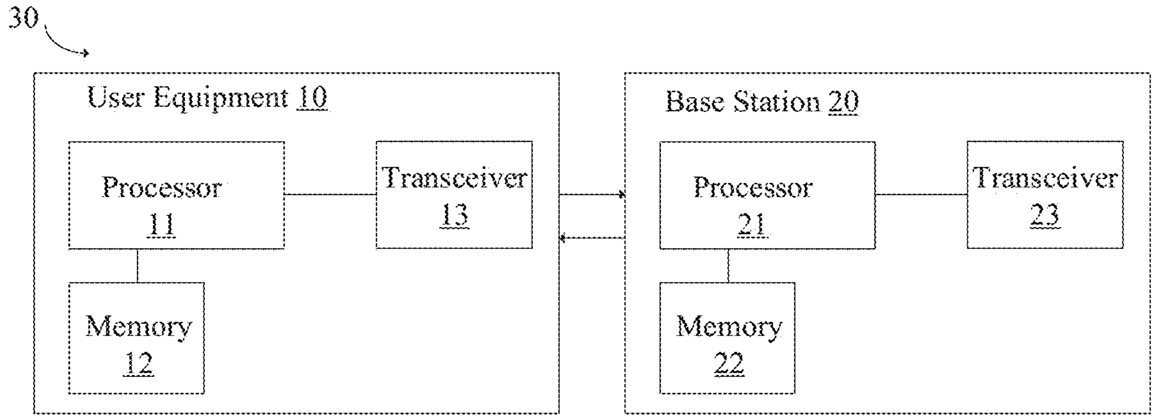
FIG. 1 is a block diagram of a user equipment (UE) and a base station (BS) (e.g., gNB) of communication in a communication network system according to an embodiment of the present disclosure.

FIG. 1 illustrates that, in some embodiments, a user equipment (UE) 10 and a base station (BS) (e.g., gNB) 20 of communication in a communication network system 30 according to an embodiment of the present disclosure are provided. The communication network system 30 includes one or more UEs 10 of a cell and the BS 20. The UE 10 may include a memory 12, a transceiver 13, and a processor 11 coupled to the memory 12, the transceiver 13. The base station 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of first information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the transceiver 13 is configured, by a base station 20, to receive a downlink transmission on a set of symbols in a slot and a set of resource blocks (RBs) and the transceiver 13 is configured to receive the configured downlink transmission on the set of symbols in the slot and on the set of RBs, or otherwise to cancel reception of the configured downlink transmission on the set of symbols in the slot and on the set of RBs. This can solve issues in the prior art and provide a method of receiving a configured downlink transmission on a set of symbols in a slot and a set of resource blocks (RBs) or otherwise canceling reception of the configured downlink transmission on the set of symbols in the slot and on the set of RBs.

In some embodiments, the transceiver 13 is configured, by a base station 20, to receive a downlink transmission on a set of symbols in a slot and receive the configured downlink transmission when the configured downlink transmission is valid or realized. This can provide a method of receiving the configured downlink transmission by the UE if a condition is met. In some embodiments, the processor 11 is configured to control the transceiver 13 to cancel reception of the configured downlink transmission when the configured downlink transmission is invalid or not realized. This can provide a method of canceling reception of the configured downlink transmission by the UE if a condition is not met. The configured downlink transmission validation is corresponding to the presented method.

In some embodiments, the set of symbols in the slot are configured as flexible by parameters, tdd-UL-DL-ConfigurationCommon and tdd-UL-DLConfigurationDedicated. The parameters are provided in system information and the slot format of the set of symbols may be updated to downlink or uplink or remain flexible by a DCI format. In some embodiments, the processor 11 is configured to control the transceiver 13 to receive the configured downlink transmission if at least one of the followings is met: a first condition comprises that the processor 11 detects a downlink control information (DCI) format, and the processor 11 considers the set of symbols as downlink when the DCI format is detected; a second condition comprises that the processor 11 detects the DCI format, and the processor 11 considers that the set of symbols are within a channel occupancy duration of a base station 20 when the DCI format is detected; or a third condition comprises that the processor 11 detects the DCI format, and the processor 11 considers that resource block (RB) sets where a first set of RBs are allocated in are available for reception when the DCI format is detected. In some embodiments, the DCI format is a DCI format 2_0.

In some embodiments, the DCI format comprises at least one of the followings: in the first condition, a first information indicates that the set of symbols are downlink; in the second condition, a second information indicates that the set of symbols are within the channel occupancy duration of the base station 20; or in the third condition, a third information indicates that the RB sets where the set of RBs are allocated in are available for reception. In some embodiments, the DCI format does not comprise at least one of the followings: in the first condition, a first information that is used to indicate one or more slot formats: in the second condition, a second information that is used to indicate the channel occupancy duration of the base station 20, or in the third condition, a third information that is used to indicate one or more RB sets availability for reception.

In some embodiments, if in the first condition, the DCI format does not comprise the first information that is used to indicate one or more slot format. Due to the absence of the first information in the DCI format, the slot format of the set of symbols cannot be indicated, thus, the processor 11 considers that the first set of symbols are indicated as downlink. In some embodiments, if the first condition is met, the transceiver 13 receives the configured downlink transmission; otherwise the transceiver 13 cancels reception of the configured downlink transmission.

In some embodiments, if in the second condition, the DCI format does not comprise the second information that is used to indicate the channel occupancy duration of the base station 20, the processor 11 cannot obtain the channel occupancy duration indication from the DCI format due to the absence of the second information. In this case, the processor 11 considers that the first set of symbols are within the channel occupancy duration of the base station by the first information when the DCI format comprises the first information and the transceiver 13 receives the first information in the DCI format that indicates the slot format of the set of symbols. In some embodiments, if in the second condition, the DC format does not comprise the second information indicating the channel occupancy duration of the base station, the processor considers that the first set of symbols are within the channel occupancy duration of the base station 20 by a higher layer parameter when the transceiver 13 receives the higher layer parameter that indicates that the set of symbols are within the channel occupancy duration of the base station 20. In some embodiments, if in the second condition, the DCI format does not comprise the first information and the second information, the processor 11 considers that the first set of symbols are within the channel occupancy duration of the base station by a higher layer parameter when the transceiver 13 receives the higher layer parameter that indicates that the set of symbols are within the channel occupancy duration of the base station 20. In some embodiments, the higher layer parameter comprises semiStaticChannelAccessConfig-r16. In some embodiments, the channel occupancy duration is a periodic channel occupancy provided by the higher layer parameter.

In some embodiments, if the first condition and the second condition are met, the transceiver 13 receives the configured downlink transmission; otherwise the transceiver 13 cancels reception of the configured downlink transmission. In some embodiments, if in the third condition, the DCI format does not comprise the third information that is used to indicate one or more RB sets availability for reception and if the first set of RBs are in one or more RB sets, the processor 11 cannot obtain the RB set availability for reception indication from the DCI format, thus the processor 11 considers that the RB sets are available for reception when the processor 11 detects the DCI format. In an implementation, the processor 11 considers that the RB sets are available for reception when the set of the symbols are within the channel occupancy duration of the base station 20, where the channel occupancy duration is determined by other presented embodiments. In some embodiments, if the DCI format does not comprise at least one of the first information, the second information, and the third information, and if the processor 11 does not detect the DCI format providing a corresponding indication for the configured downlink transmission, the transceiver 13 receives the configured downlink transmission. In some embodiments, if the DCI format comprises at least one of the first information, the second information, and the third information, and if the processor 11 does not detect the DCI format providing a corresponding indication for the configured downlink transmission, in this case, the processor 11 cannot verify if the validation conditions are met for receiving the configured downlink transmission, thus, the processor 11 considers the validation conditions are not met, and the transceiver 13 cancels reception of the configured downlink transmission. In some embodiments, if the DCI format comprises at least one of the first information, the second information, and the third information, and if the processor 11 does not detect the DCI format providing a corresponding indication for the configured downlink transmission, in this case, the processor 11 cannot verify if the validation conditions are met for receiving the configured downlink transmission, thus, the processor 11 does not consider all the configured downlink transmission is valid, and the transceiver 13 only receives valid configured downlink transmission. The valid configured downlink transmission in this case is physical downlink shared channel (PDSCH) transmission or physical downlink control channel (PDCCH) transmission and the invalid configured downlink transmission is channel state information reference signal (CSI-RS) transmission. In some embodiments, the corresponding indication from the first information is that the set of symbols are downlink or flexible or uplink. In an implementation, the corresponding indication from the first information is that the set of symbols are downlink. In some embodiments, the corresponding indication from the second information is that the set of symbols are in the channel occupancy duration of the base station. In some embodiments, the corresponding indication from the third information is that one or more RB sets, where the set of RBs are configured in, are available for reception.

In some embodiments, if the first condition, the second condition, and the third condition are met, the transceiver 13 receives the configured downlink transmission; otherwise the transceiver 13 cancels reception of the configured downlink transmission. In some embodiments, the configured downlink transmission comprises a channel state information reference signal (CSI-RS) transmission, a physical downlink shared channel (PDSCH) transmission, or a physical downlink control channel (PDCCH) transmission. In some embodiments, the set of symbols in the slot are indicated by a slot format indication (SFI)-index field in the DCI format. In some embodiments, if parameters, tdd-UL-DL-ConfigurationCommon and tdd-UL-DLConfiguration-Dedicated are not provided, all the symbols are considered as flexible.

Figure 2:
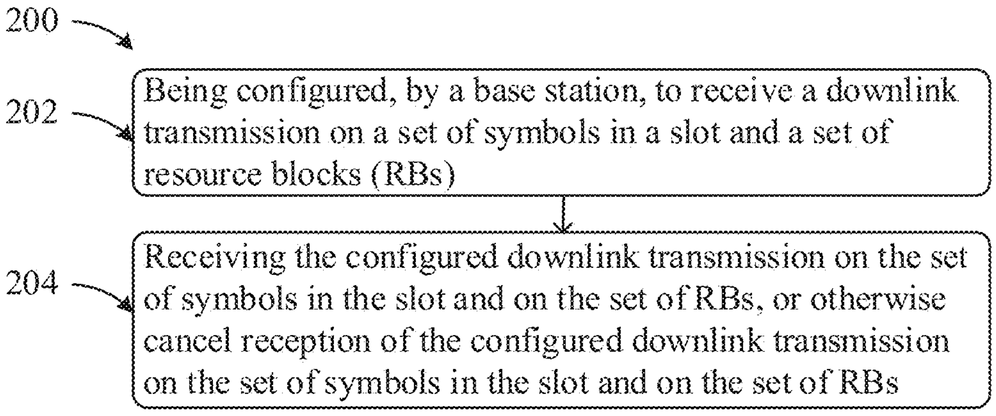
FIG. 2 is a flowchart illustrating a method of communication of a UE according to an embodiment of the present disclosure.

FIG. 2 illustrates a method 200 of communication of a UE according to an embodiment of the present disclosure. In some embodiments, the method 200 includes: a block 202, being configured, by a base station, to receive a downlink transmission on a set of symbols in a slot and a set of resource blocks (RBs), and a block 204, receiving the configured downlink transmission on the set of symbols in the slot and on the set of RBs, or otherwise cancel reception of the configured downlink transmission on the set of symbols in the slot and on the set of RBs. This can solve issues in the prior art and provide a method of receiving a configured downlink transmission on a set of symbols in a slot and a set of resource blocks (RBs) or otherwise canceling reception of the configured downlink transmission on the set of symbols in the slot and on the set of RBs.

In some embodiments, the set of symbols in the slot are configured as flexible by one or more parameters, tdd-UL-DL-ConfigurationCommon and/or tdd-UL-DLConfigurationDedicated. The parameters are provided in system information and the slot format of the set of symbols may be updated to downlink or uplink or remain flexible by a DCI format. In some embodiments, receiving the configured downlink transmission on the set of symbols in the slot and on the set of RBs comprises receiving the configured downlink transmission on the set of symbols in the slot and on the set of RBs if the UE detects a downlink control information (DCI) format. In some embodiments, canceling the reception of the configured downlink transmission on the set of symbols in the slot and on the set of RBs comprises canceling the reception of the configured downlink transmission on the set of symbols in the slot and on the set of RBs if the UE does not detect a DCI format. In some embodiments, the DCI format is a DCI format 2_0. In some embodiments, the DCI format comprises at least one of the followings: a first information that is used to indicate one or more slot formats: a second information that is used to indicate the channel occupancy duration of the base station: or a third information that is used to indicate one or more RB sets availability for reception. In some embodiments, the DCI format comprises the first information, and the first information indicates the set of symbols as downlink. In some embodiments, the DCI format comprises the second information, and the second information indicates that the set of symbols are within the channel occupancy duration of the base station. In some embodiments, the DCI format comprises the third information, and the third information indicates that one or more RB sets, where the set of RBs are allocated in, are available for reception. In some embodiments, the UE is configured to monitor PDCCH for detection of the DCI format 2_0 but the UE does not detect the DCI format 2_0.

In some embodiments, the DCI format does not comprise at least one of the followings: in the first condition, a first information that is used to indicate one or more slot formats: in the second condition, a second information that is used to indicate the channel occupancy duration of the base station; or in the third condition, a third information that is used to indicate one or more RB sets availability for reception.

In some embodiments, if the DCI format does not comprise the first information that is used to indicate one or more slot formats. Due to the absence of the first information in the DCI format, the slot format of the set of symbols cannot be indicated by the DCI format, thus, the set of symbols are downlink. In some embodiments, if the DCI format does not comprise the second information that is used to indicate the channel occupancy duration of the base station. Due to the absence of the second information in the DCI format, the set of symbols are within the channel occupancy duration of the base station when the UE receives the first information in the DCI format indicating that the set of symbols are downlink or uplink or flexible.

In some embodiments, if the DCI format does not comprise the second information indicating the channel occupancy duration of the base station, the set of symbols are within the channel occupancy duration of the base station when the UE receives a higher layer parameter that indicates that the set of symbols are within the channel occupancy duration of the base station. In some embodiments, the channel occupancy duration is a periodic channel occupancy provided by the higher layer parameter. In some embodiments, the higher layer parameter is semiStaticChannelAccessConfig-r16. In some embodiments, the higher layer parameter is received by the UE from the system information or radio resource configuration (RRC). In some embodiments, the system information is system information block 1 (SIB1). In some embodiments, if the DCI format does not comprise the first information and the second information indicating that the set of symbols are within the channel occupancy duration of the base station, the set of symbols are within the channel occupancy duration of the base station when the UE receives a higher layer parameter that indicates that the set of symbols are within the channel occupancy duration of the base station.

In some embodiments, if the DCI format does not comprise the third information indicating one or more RB sets availability for reception. In this case, the UE cannot obtain the RB set availability for reception indication from the DCI format, at the same time if the base station configures the set of RBs of the configured downlink transmission in one or more RB sets it would be more logical that the one or more RB sets are available for reception when the UE detects the DCI format. In an implementation, the one or more RB sets are available for reception w % ben the set of the symbols are within the channel occupancy duration of the base station, where the channel occupancy duration determination is presented in other embodiments. In some embodiments, receiving the configured downlink transmission on the set of symbols in the slot and on the set of RBs comprises: receiving the configured downlink transmission on the set of symbols in the slot and on the set of RBs if the UE does not detect the DCI format. In some embodiments, the DCI format comprises DCI format 2_0.

In some embodiments, receiving the configured downlink transmission on the set of symbols in the slot and on the set of RBs comprises: receiving the configured downlink transmission on the set of symbols in the slot and on the set of RBs if the UE does not detect the DCI format. In some embodiments, the DCI format is DCI format 2_0, where the DCI format 2_0 does not comprise at least one of the followings: a first information that is used to indicate one or more slot formats; a second information that is used to indicate the channel occupancy duration of the base station; or a third information that is used to indicate one or more RB sets availability for reception. In some embodiments, if the DCI format comprises at least one of the first information, the second information, and the third information, and if the UE does not detect the DCI format providing a corresponding indication for the configured downlink transmission, in this case, the UE cannot verify if the validation conditions are met for receiving the configured downlink transmission, thus, the UE cancels the reception of the configured downlink transmission. In an implementation, the UE receives the configured downlink transmission if the downlink transmission is physical downlink shared channel (PDSCH) transmission or physical downlink control channel (PDCCH) transmission, and the UE cancels the reception of the configured downlink transmission if the downlink transmission is channel state information reference signal (CSI-RS) transmission. In some embodiments, the corresponding indication from the first information is that the set of symbols are downlink or flexible or uplink. In an implementation, the corresponding indication from the first information is that the set of symbols are downlink. In some embodiments, the corresponding indication from the second information is that the set of symbols are in the channel occupancy duration of the base station. In some embodiments, the corresponding indication from the third information is that one or more RB sets, where the set of RBs are configured in, are available for reception.

In some embodiments, the configured downlink transmission comprises a channel state information reference signal (CSI-RS), a physical downlink shared channel (PDSCH), or a physical downlink control channel (PDCCH). In some embodiments, the first information is the slot format indication (SFI)-index field in DCI format 2_0. In some embodiments, the second information is the channel occupancy duration field in DCI format 2_0. In some embodiments, the third information comprises a bitmap having a one-to-one mapping with a set of RB sets in DCI format 2_0. In some embodiments, if the one or more parameters, tdd-UL-DL-ConfigurationCommon and/or tdd-UL-DLConfiguration-Dedicated are not provided, all the symbols are considered as flexible.

Figure 3:
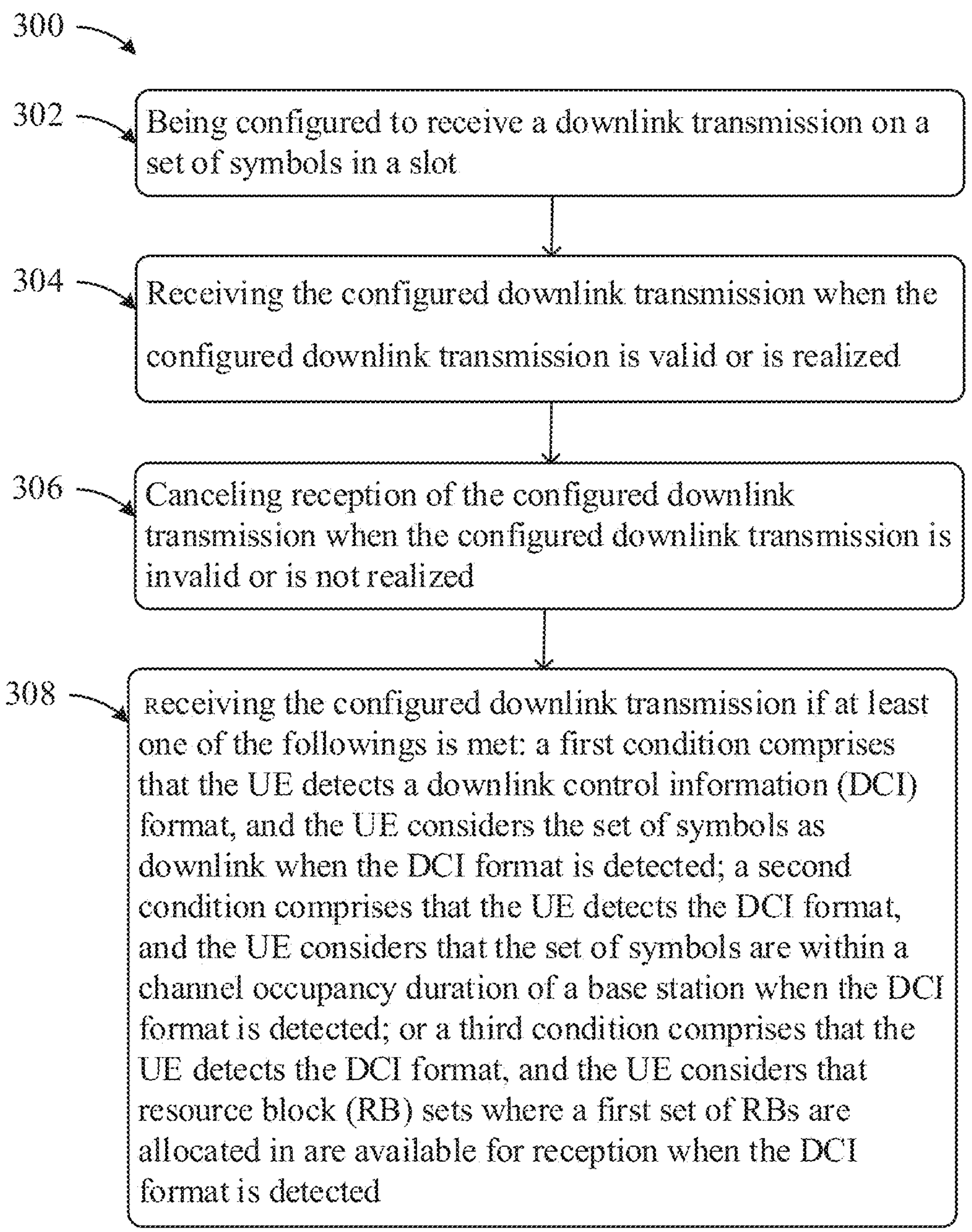
FIG. 3 is a flowchart illustrating a method of communication of a UE according to an embodiment of the present disclosure.

FIG. 3 illustrates a method 300 of communication of a UE according to an embodiment of the present disclosure. In some embodiments, the method 300 includes: a block 302, being configured to receive a downlink transmission on a set of symbols in a slot, a block 304, receiving the configured downlink transmission when the configured downlink transmission is valid or is realized, a block 306, canceling reception of the configured downlink transmission when the configured downlink transmission is invalid or is not realized, and a block 308, receiving the configured downlink transmission if at least one of the followings is met: a first condition comprises that the UE detects a downlink control information (DCI) format, and the UE considers the set of symbols as downlink when the DCI format is detected; a second condition comprises that the UE detects the DCI format, and the UE considers that the set of symbols are within a channel occupancy duration of a base station when the DCI format is detected; or a third condition comprises that the UE detects the DCI format, and the UE considers that resource block (RB) sets where a first set of RBs are allocated in are available for reception when the DCI format is detected. This can provide a method of receiving a configured downlink transmission by a UE if a condition is met, and further provide a method of canceling reception of the configured downlink transmission by the UE if a condition is not met.

In some embodiments, the set of symbols in the slot are configured as flexible by parameters, tdd-UL-DL-ConfigurationCommon and tdd-UL-DLConfigurationDedicated. In some embodiments, the DCI format is DCI format 2_0. In some embodiments, the DCI format comprises at least one of the followings: in the first condition, a first information indicates that the set of symbols are downlink; in the second condition, a second information indicates that the set of symbols are within the channel occupancy duration of the base station; or in the third condition, a third information indicates that the RB sets where the first set of RBs are allocated in are available for reception. In some embodiments, the DCI format does not comprise at least one of the followings: in the first condition, a first information that is used to indicate one or more slot formats, in the second condition, a second information that is used to indicate the channel occupancy duration of the base station; or in the third condition, a third information that is used to indicate one or more RB sets availability for reception.

In some embodiments, if in the first condition, the DCI format does not comprise the first information, the UE considers that the first set of symbols are indicated as downlink. In some embodiments, if the first condition is met, the UE receives the configured downlink transmission; otherwise the UE cancels reception of the configured downlink transmission. In some embodiments, if in the second condition, the DCI format does not comprise the second information that is used to indicate the channel occupancy duration of the base station. Due to the absence of the second information in the DCI format, the set of symbols are within the channel occupancy duration of the base station when the UE receives the first information in the DCI format indicating that the set of symbols are downlink or uplink or flexible. In some embodiments, if in the second condition, the DCI format does not comprise the second information that is used to indicate the channel occupancy duration of the base station, the UE considers that the first set of symbols are within the channel occupancy duration of the base station when the UE receives the higher layer parameter that indicates that the set of symbols are within the channel occupancy duration of the base station.

In some embodiments, if in the second condition, the DCI format does not comprise the first information and the second information the UE considers that the first set of symbols are within the channel occupancy duration of the base station when the UE receives the higher layer parameter that indicates that the set of symbols are within the channel occupancy duration of the base station. In some embodiments, the higher layer parameter is semiStaticChannelAccessConfig-r16. In some embodiments, the channel occupancy duration is a periodic channel occupancy provided by the higher layer parameter. In some embodiments, the higher layer parameter is received by the UE from the system information or radio resource configuration (RRC). In some embodiments, the system information is system information block 1 (SIB1). In some embodiments, if the first condition and the second condition are met, the UE receives the configured downlink transmission, otherwise the UE cancels reception of the configured downlink transmission. In some embodiments, if in the third condition, the DCI format does not comprise the third information indicating one or more RB sets availability for reception. In this case, the UE cannot obtain the RB set availability for reception indication from the DCI format, at the same time if the base station configures the set of RBs of the configured downlink transmission in one or more RB sets, it would be more logical that the one or more RB sets are available for reception when the UE detects the DCI format. In an implementation, the one or more RB sets are available for reception when the set of the symbols are within the channel occupancy duration of the base station, where the channel occupancy duration determination is presented in other embodiments. In some embodiments, if the DCI format does not comprise at least one of the first information, the second information, and the third information, and if the UE does not detect the DCI format providing a corresponding indication for the configured downlink transmission, the UE receives the configured downlink transmission. In some embodiments, if the DCI format comprises at least one of the first information, the second information, and the third information, and if the UE does not detect the DCI format providing a corresponding indication for the configured downlink transmission, the UE cancels reception of the configured downlink transmission. In some embodiments, if the DCI format comprises at least one of the first information, the second information, and the third information, and if the UE does not detect the DCI format providing a corresponding indication for the configured downlink transmission, the UE cancels reception of the configured downlink transmission when the downlink is CSI-RS transmission. In some embodiments, if the DCI format comprises at least one of the first information, the second information, and the third information, and if the UE does not detect the DCI format providing a corresponding indication for the configured downlink transmission, the UE receives the configured downlink transmission when the downlink is PDSCH or PDCCH transmission. In some embodiments, if the first condition, the second condition, and the third condition are met, the UE receives the configured downlink transmission; otherwise the UE cancels reception of the configured downlink transmission. In some embodiments, the configured downlink transmission comprises a channel state information reference signal (CSI-RS) transmission, a physical downlink shared channel (PDSCH) transmission, or a physical downlink control channel (PDCCH) transmission. In some embodiments, the set of symbols in the slot are updated by a slot format indication (SFI)-index field in the DCI format. In some embodiments, if parameters, tdd-UL-DL-ConfigurationCommon and tdd-UL-DLConfiguration-Dedicated are not provided, all the symbols are considered as flexible.

In the above, in some embodiments, for a first set of symbols in a slot that are configured by tdd-UL-DL-ConfigurationCommon and tdd-UL-DLConfigurationDedicated as flexible, and a UE is configured to receive DCI format 2_0 and the UE is also configured by higher layer to receive a first downlink transmission that is on the first set of symbols in a time domain and on a first set of RBs in a frequency domain, the UE will receive the first downlink transmission if a first condition is met.

The first condition is that the UE detects a DCI format 2_0 that provides the first information indicating the first set of symbols as downlink. Otherwise, the UE cancels the reception of the first downlink transmission. In some cases, the DCI format 2_0 does not comprise the first information, the UE will consider that the first set of symbols are not indicated as downlink. Alternatively, the UE can consider that the first set of symbols are indicated as downlink.

In some cases, the UE receives the first downlink transmission if the first condition and a second condition are met, otherwise the UE cancels the reception of the first downlink transmission. The second condition is that the UE detects a DCI format 2_0 that provides the second information indicating that the first set of symbols are within the channel occupancy duration of the gNB. But if the DCI format 2_0 does not comprise the second information, the channel occupancy duration is indicated by the first information, i.e. if the UE receives the first information in a DCI format 2_0 that provides the slot or symbol format indication for the first set of symbols, the first set of symbols are considered as within the channel occupancy duration. On the other hand, if the UE is configured with higher layer parameter ChannelAccessMode-r16='semistatic', in case that DCI format 2_0 does not comprise the first information and the second information, the channel occupancy duration is a periodic channel occupancy provided by semiStaticChannelAccess-Config-r16.

In some cases, the UE receives the first downlink transmission if the first condition and the second condition and a third condition are met, otherwise the UE cancels the reception of the first downlink transmission. The third condition is that the UE detects a DCI format 2_0 that provides the third information indicating that the RB sets where the first set of RBs are allocated in is available for reception. In some cases, if the first set of RBs are in one or more RB sets and the third information is not included in DCI format 2_0, UE can assume that the RB sets are available for reception. In an implementation, if the first set of RBs are in one or more RB sets and the third information is not included in DCI format 2_0, UE can assume that the RB sets are available for reception when the set of symbols are within the channel occupancy duration of the base station, where the channel occupancy duration determination is presented in other embodiments. In some cases, if DCI format 2_0 comprises the first information and/or the second information and/or the third information, and the UE does not detect a DCI format 20 providing the corresponding indication for the first downlink transmission, the UE cancels the reception of the first downlink transmission. In some embodiments, if the DCI format 2_0 comprises the first information and/or the second information and/or the third information, and the UE does not detect the DCI format 2_0 providing the corresponding indication for the first downlink transmission, the UE cancels reception of the first downlink transmission when the downlink is CSI-RS transmission. In some embodiments, if the DCI format comprises the first information and/or the second information and/or the third information, and the UE does not detect the DCI format 2_0 providing the corresponding indication for the first downlink transmission, the UE receives the first downlink transmission when the downlink is PDSCH or PDCCH transmission. In some cases, if DCI format 2_0 does not comprise the first information and/or the second information and/or the third information, and the UE does not detect a DCI format 2_0 providing the corresponding indication for the first downlink transmission, the UE receives the first downlink transmission.

Figure 4:
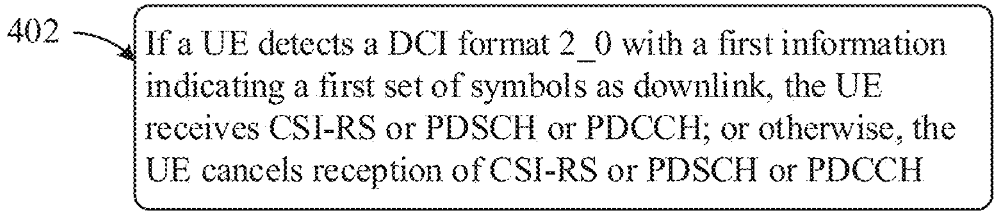
FIG. 4 is a flowchart illustrating a method of communication of a UE according to an example 1 of the present disclosure.

FIG. 4 illustrates a method of communication of a UE according to an example 1 of the present disclosure. FIG. 4 illustrates that in the example 1, a DCI format 2_0 comprises a first information. If a UE detects a DCI format 2_0 with a first information indicating a first set of symbols as downlink, the UE receives CSI-RS or PDSCH or PDCCH; or otherwise, the UE cancels reception of CSI-RS or PDSCH or PDCCH (as illustrated in a block 402 of FIG. 4).

Figure 5:
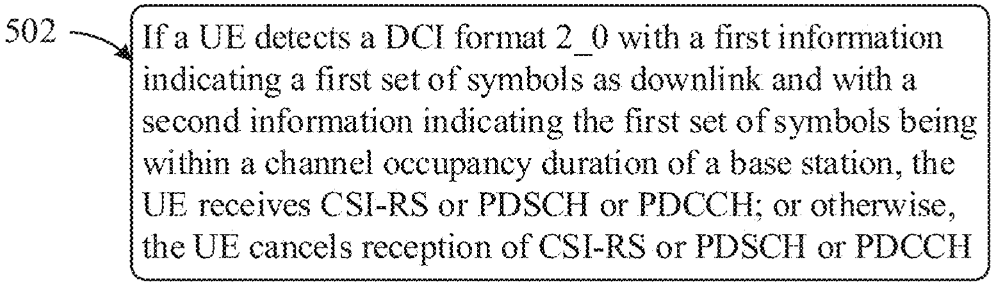
FIG. 5 is a flowchart illustrating a method of communication of a UE according to an example 2 of the present disclosure.

FIG. 5 illustrates a method of communication of a UE according to an example 2 of the present disclosure. FIG. 5 illustrates that in the example 2, a DCI format 2_0 comprises a first information and a second information. If a UE detects a DCI format 2_0 with a first information indicating a first set of symbols as downlink and with a second information indicating the first set of symbols being within a channel occupancy duration of a base station, the UE receives CSI-RS or PDSCH or PDCCH; or otherwise, the UE cancels reception of CSI-RS or PDSCH or PDCCH (as illustrated in a block 502 of FIG. 5).

Figure 6:
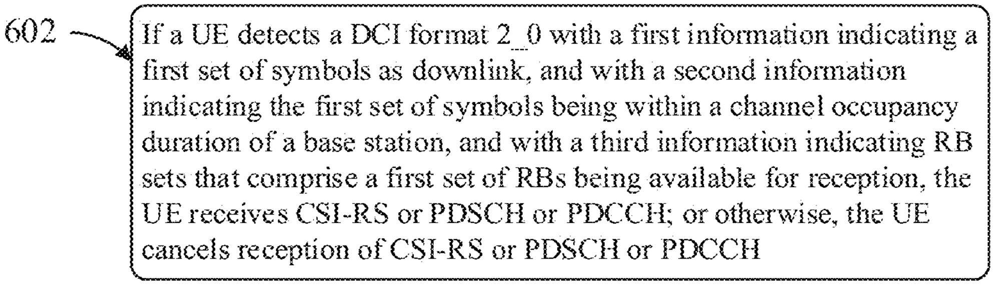
FIG. 6 is a flowchart illustrating a method of communication of a UE according to an example 3 of the present disclosure.

FIG. 6 illustrates a method of communication of a UE according to an example 3 of the present disclosure. FIG. 6 illustrates that in the example 3, configured CSI-RS or PDSCH or PDCCH is allocated with a first set of resource blocks in one or more RB sets. A DCI format 2_0 comprises a first information, a second information, and a third information. If a UE detects a DCI format 2_0 with a first information indicating a first set of symbols as downlink, and with a second information indicating the first set of symbols being within a channel occupancy duration of a base station, and with a third information indicating RB sets that comprise a first set of RBs being available for reception, the UE receives CSI-RS or PDSCH or PDCCH; or otherwise, the UE cancels reception of CSI-RS or PDSCH or PDCCH (as illustrated in a block 602 of FIG. 6).

Figure 7:
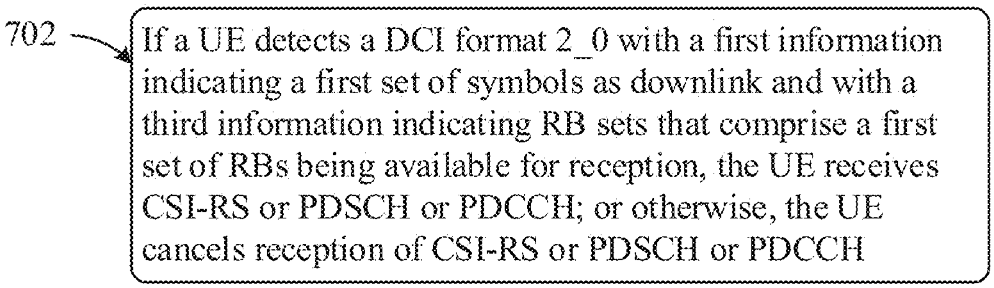
FIG. 7 is a flowchart illustrating a method of communication of a UE according to an example 4 of the present disclosure.

FIG. 7 illustrates a method of communication of a UE according to an example 4 of the present disclosure. FIG. 7 illustrates that in the example 4, configured CSI-RS or PDSCH or PDCCH is allocated with a first set of resource blocks in one or more RB sets. A DCI format 2_0 comprises a first information and a third information. If a UE detects a DCI format 2_0 with a first information indicating a first set of symbols as downlink and with a third information indicating RB sets that comprise a first set of RBs being available for reception, the UE receives CSI-RS or PDSCH or PDCCH: or otherwise, the UE cancels reception of CSI-RS or PDSCH or PDCCH (as illustrated in a block 702 of FIG. 7). Note that in this example, the channel occupancy duration is indicated also by the first information. i.e. if the UE receives the first information in a DCI format 2_0 that provides the slot or symbol format indication for the first set of symbols, the first set of symbols are considered as within the channel occupancy duration.

Figure 8:
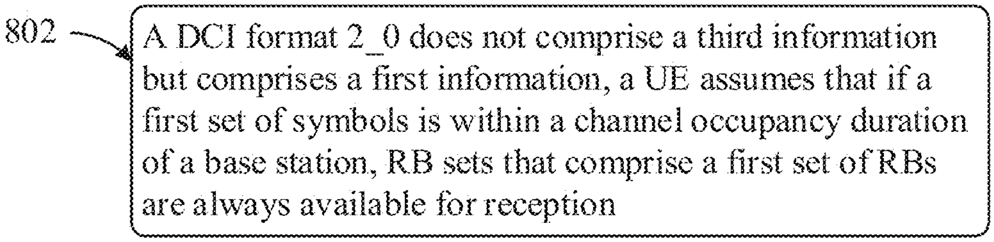
FIG. 8 is a flowchart illustrating a method of communication of a UE according to an example 5 of the present disclosure.

FIG. 8 illustrates a method of communication of a UE according to an example 5 of the present disclosure. FIG. 8 illustrates that in the example 5, configured CSI-RS or PDSCH or PDCCH is allocated with a first set of resource blocks in one or more RB sets. In this case, a DCI format 2_0 does not comprise a third information but comprises a first information, a UE assumes that if a first set of symbols are within a channel occupancy duration of a base station, RB sets that comprise a first set of RBs are available for reception (as illustrated in a block 802 of FIG. 8). Similar to example 4, the channel occupancy duration is provided by the first information, i.e. if the UE receives the first information in a DCI format 2_0 that provides the slot or symbol format indication for the first set of symbols, the first set of symbols are considered as within the channel occupancy duration. Thus, the UE will only check the first information in DCI format 2_0, i.e., if the UE detects a DCI format 2_0 with the first information indicating the first set of symbols as downlink, the UE receives the CSI-RS or PDSCH or PDCCH, or otherwise, the UE cancels the reception of the CSI-RS or PDSCH or PDCCH.

Figure 9:
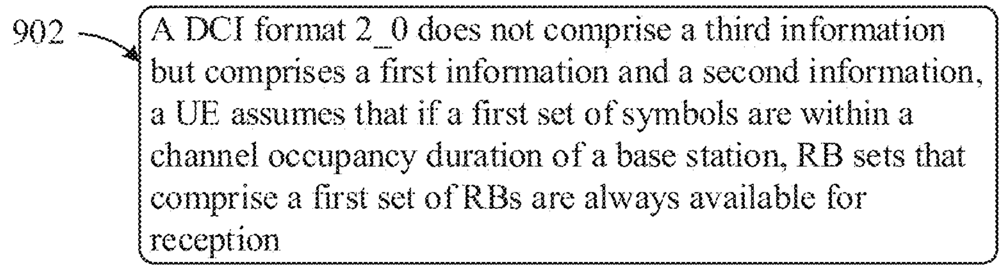
FIG. 9 is a flowchart illustrating a method of communication of a UE according to an example 6 of the present disclosure.

FIG. 9 illustrates a method of communication of a UE according to an example 6 of the present disclosure. FIG. 9 illustrates that in the example 6, configured CSI-RS or PDSCH or PDCCH is allocated with a first set of resource blocks in one or more RB sets. In this case, a DCI format 2_0 does not comprise a third information but comprises a first information and a second information, a UE assumes that if a first set of symbols are within a channel occupancy duration of a base station, RB sets that comprise a first set of RBs are available for reception (as illustrated in a block 902 of FIG. 9). Thus, the UE will check both the first information and the second information in DCI format 2_0, i.e. if the UE detects a DCI format 2_0 with the first information indicating the first set of symbols as downlink, and with the second information indicating the first set of symbols being within the channel occupancy duration, the UE receives CSI-RS or PDSCH or PDCCH; or otherwise, the UE cancels the reception of the CSI-RS or PDSCH or PDCCH.

In the following examples, it is discussed that the case where the first information is not included in DCI format 2_0. Then what is the UE behavior for the configured CSI-RS, PDSCH, PDCCH reception.

Figure 10:
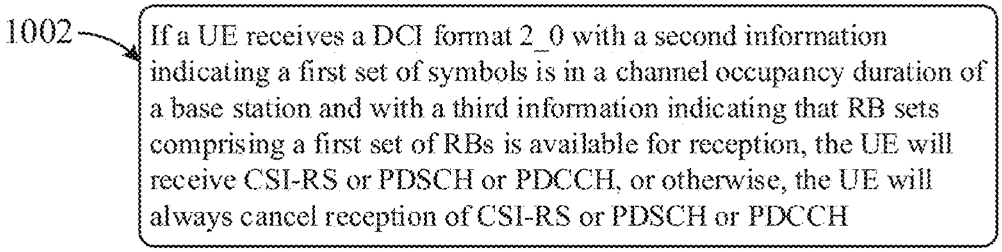
FIG. 10 is a flowchart illustrating a method of communication of a UE according to an example 7 of the present disclosure.

FIG. 10 illustrates a method of communication of a UE according to an example 7 of the present disclosure. FIG. 10 illustrates that in the example 7, configured CSI-RS or PDSCH or PDCCH is allocated with a first set of resource blocks in one or more RB sets. A DCI format 2_0 does not comprise the first information but comprises the third information and/or the second information. In this case, if a UE receives a DCI format 2_0 with a second information indicating a first set of symbols are in a channel occupancy duration of a base station and with a third information indicating that RB sets comprising a first set of RBs are available for reception, the UE will receive CSI-RS or PDSCH or PDCCH, or otherwise, the UE will cancel reception of CSI-RS or PDSCH or PDCCH (as illustrated in a block 1002 of FIG. 10). Note that the channel occupancy duration in this case is indicated by the second information in DCI format 2_0. But if the UE is configured with higher layer parameter ChannelAccessMode-r16='semistatic', if the DCI format 2_0 does not comprise the second information, the channel occupancy duration is the periodic channel occupancy provided by semiStaticChannelAccessConfig-r16.

In a similar example, if the UE is not configured with an active downlink (DL) bandwidth part that contains more than one RB sets, the third information is not necessary. Thus, if the DCI format 2_0 does not comprise the first information, the UE will only rely on the channel occupancy duration to decide if the UE will receive the CSI-RS or PDSCH or PDCCH. If the first set of symbols are within the channel occupancy duration, the UE will receive otherwise the UE will cancel the reception.

Figure 11:
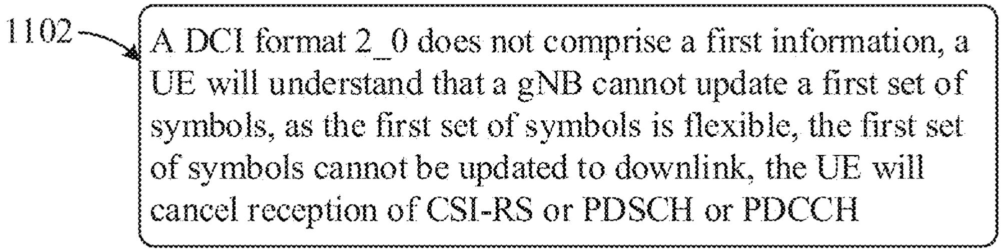
FIG. 11 is a flowchart illustrating a method of communication of a UE according to an example 8 of the present disclosure.

FIG. 11 illustrates a method of communication of a UE according to an example 8 of the present disclosure. FIG. 11 illustrates that in the example 8, a DCI format 2_0 does not comprise a first information. Thus, the UE will understand that a gNB cannot update a first set of symbols. As the first set of symbols are flexible, and the first set of symbols cannot be updated to downlink. Thus, the UE will cancel the reception of the CSI-RS or PDSCH or PDCCH (as illustrated in a block 1102 of FIG. 11).

Alternatively, the UE can see this configuration as an invalid case, this is because it would be useless for the gNB to configure the CSI-RS or PDSCH and configure the DCI format 2_0 without the first information, if the UE would cancel the configured reception. In this case, another solution is that if the DCI format 2_0 is not configured to include the first information and the UE is configured by the higher layer to receive CSI-RS or PDSCH on the first set of symbols in a slot. The UE will consider the first set of symbols as downlink. And then the UE should check further other conditions as presented in examples 2-7 to decide if the UE needs to perform the reception or cancel the reception.

Figure 12:
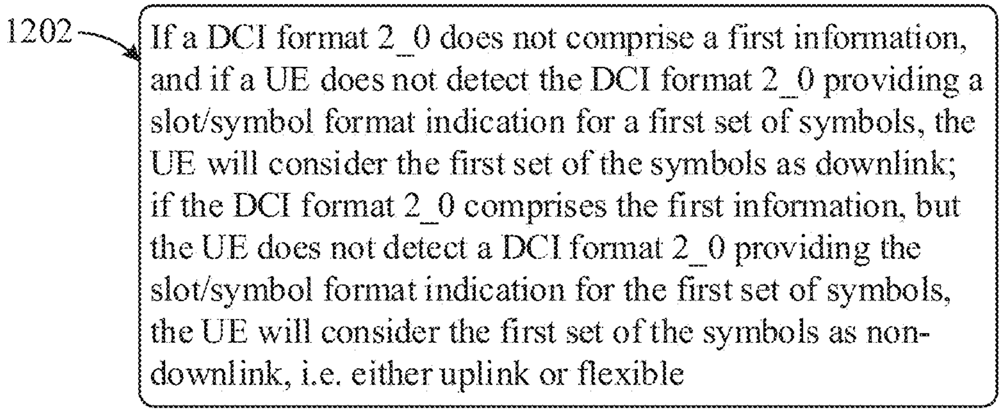
FIG. 12 is a flowchart illustrating a method of communication of a UE according to an example 9 of the present disclosure.

FIG. 12 illustrates a method of communication of a UE according to an example 9 of the present disclosure. FIG. 12 illustrates that in the example 9, a UE is configured to monitor PDCCH with DCI format 2_0. Moreover, the DCI format 2_0 does not comprise a first information. If the UE does not detect a DCI format 20 providing a slot/symbol format indication for a first set of symbols, the UE will consider the first set of the symbols as downlink. On the other hand, if the DCI format 2_0 comprises the first information, but the UE does not detect a DCI format 20 providing the slot/symbol format indication for the first set of symbols, the UE will consider the first set of the symbols as non-downlink, i.e. either uplink or flexible (as illustrated in a block 1202 of FIG. 12). In an implementation, a UE is configured to monitor PDCCH with DCI format 2_0 and if the DCI format 20 comprises the first information, but the UE does not detect the DCI format 20 that provides the expected slot format indication on the first set of symbols, the UE will cancel the reception of the configured downlink transmission if the transmission is CSI-RS, and the UE will receive the configured downlink transmission if the transmission is PDSCH or PDCCH. Note that here the expected slot format indication is downlink or uplink or flexible. In an implementation, a UE is configured to monitor PDCCH with DCI format 2_0 and if the DCI format 2_0 comprises the second information, but the UE does not detect the DCI format 2_0 that provides the expected indication on the first set of symbols, the UE will cancel the reception of the configured downlink transmission if the transmission is CSI-RS, and the UE will receive the configured downlink transmission if the transmission is PDSCH or PDCCH. Note that here the expected indication is that the first set of symbols are in the channel occupancy duration of the base station. In an implementation, a UE is configured to monitor PDCCH with DCI format 2_0 and if the DCI format 2_0 comprises the third information, but the UE does not detect the DCI format 20 that provides the expected indication on the first set of RBs, the UE will cancel the reception of the configured downlink transmission if the transmission is CSI-RS, and the UE will receive the configured downlink transmission if the transmission is PDSCH or PDCCH. Note that here the expected indication is that the one or more RB sets, where the first set of RBs are configured in, are available for reception.

In summary, in some embodiments, in a time division duplex (TDD) system, a UE can be provided by a base station, such as a gNB, with parameters, tdd-UL-DL-ConfigurationCommon and tdd-UL-DLConfigurationDedicated to have slot and symbol pattern, the pattern configuration will inform the UE about symbol format in a slot. The symbol format comprises downlink, uplink, flexible. The downlink and uplink formats, once configured, cannot be updated: while the flexible format can be updated by an SFI-index field in a DCI format 2_0. If the tdd-UL-DL-ConfigurationCommon and tdd-UL-DLConfigurationDedicated are not provided, all the symbols are considered as flexible. In some embodiments, a first set of symbols in a slot that is configured by tdd-UL-DL-ConfigurationCommon and tdd-UL-DLConfigurationDedicated as flexible, and for a UE, the first set of symbols are configured by higher layers to receive a first configured downlink transmission, i.e. CSI-RS or a PDSCH or PDCCH. In a frequency domain, the first configured downlink transmission corresponds to a first set of resource blocks. In some embodiments, a first information is used to indicate the symbol format of the first set of symbols. One example of the first information is an SFI-index field. In some embodiments, a second information is used to indicate the channel occupancy duration for a serving cell of gNB. In some embodiments, a third information is used to resource block (RB) set availability for reception for a serving cell. The first information, the second information, and the third information may be present simultaneously in a DCI format 20 by gNB configuration, but there may also be the case that part of the first information, the second information, and the third information are present in the DCI format 2_0.

In some embodiments, the term, "cancel" may mean: do not receive or refuse to receive or reject to receive. In details, the UE cancels reception of the configured downlink transmission on the set of symbols in the slot and on the set of RBs may refer to the UE does not to receive or refuses to receive or rejects to receive the configured downlink transmission on the set of symbols in the slot and on the set of RBs or may refer to the UE refuses or rejects reception of the configured downlink transmission on the set of symbols in the slot and on the set of RBs. Canceling reception of the configured downlink transmission on the set of symbols in the slot and on the set of RBs may refer to not receiving or refuse to receive or reject to receive the configured downlink transmission on the set of symbols in the slot and on the set of RBs or may refer to refusing or rejecting reception of the configured downlink transmission on the set of symbols in the slot and on the set of RBs.

Commercial interests for some embodiments are as follows. 1. solving issues in the prior art. 2. providing a method of receiving a configured downlink transmission by a UE if a condition is met. 3. providing a method of canceling reception of the configured downlink transmission by the UE if a condition is not met. 4. providing a good communication performance. 5. providing a high reliability. 6. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 13:
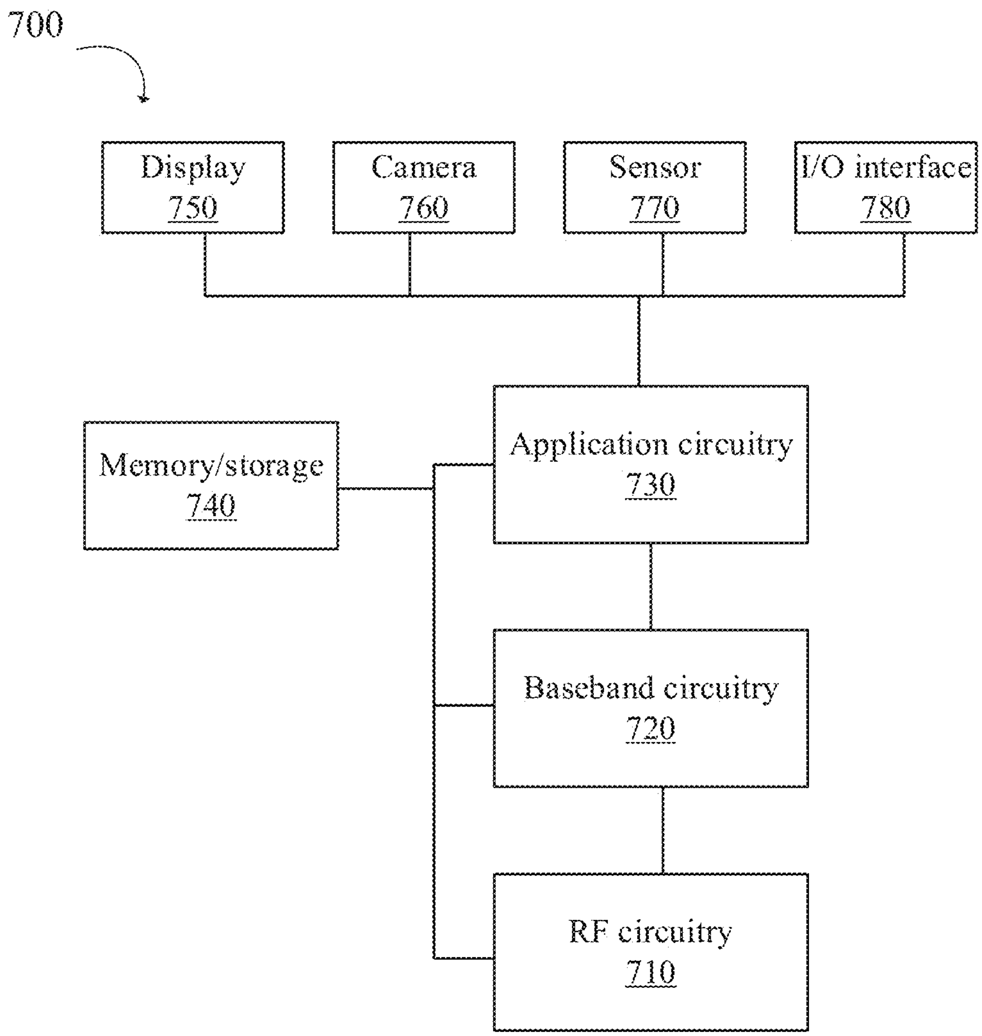
FIG. 13 is a block diagram of a system for wireless communication according to an embodiment of the present disclosure.

FIG. 13 is a block diagram of an example system 700 for wireless communication according to an embodiment of the present disclosure. Embodiments described herein may be implemented into the system using any suitably configured hardware and/or software. FIG. 13 illustrates the system 70) including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental states and/or location first information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the state of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method of communication of a user equipment (UE), comprising:

being configured, by a base station, to receive a downlink transmission on a set of symbols in a slot and a set of resource blocks (RBs); and being configured to detect a downlink control information (DCI) format, wherein the DCI format comprises at least one of the followings:

a first information that is used to indicate one or more slot formats;

a second information that is used to indicate the channel occupancy duration of the base station; or a third information that is used to indicate one or more RB sets availability for reception; and determining whether to receive or cancel reception of the configured downlink transmission on the set of symbols in the slot and on the set of RBs according to a detection result of the DCI format, wherein, in a case that the DCI format comprises at least one of the first information, the second information, and the third information, and the UE does not detect the DCI format providing a corresponding indication for the configured downlink transmission, the UE cancels the reception of the configured downlink transmission on the set of symbols in the slot and on the set of RBs; and in a case that the DCI format does not comprise at least one of the first information, the second information, and the third information, and the UE does not detect the DCI format providing a corresponding indication for the configured downlink transmission, the UE receives the configured downlink transmission.

2. The method of claim 1, wherein the set of symbols in the slot are configured as flexible by one or more parameters, tdd-UL-DL-ConfigurationCommon and/or tdd-UL-DLConfigurationDedicated.

3. The method of claim 1, wherein, in a case that the DCI format comprises at least one of the first information, the second information, and the third information, and the UE detects the DCI format providing a corresponding indication for the configured downlink transmission, receiving the configured downlink transmission on the set of symbols in the slot and on the set of RBs.

4. The method of claim 3, wherein the DCI format comprises a DCI format 2_0.

5. The method of claim 1, wherein the DCI format comprises the first information, and the first information indicates the set of symbols as downlink.

6. The method of claim 1, wherein the DCI format comprises the second information, and the second information indicates that the set of symbols are within the channel occupancy duration of the base station.

7. The method of claim 1, wherein the DCI format comprises the third information, and the third information indicates that one or more RB sets, where the set of RBs are allocated in, are available for reception.

8. A user equipment (UE), comprising:

a memory;

a transceiver; and a processor coupled to the memory and the transceiver; wherein:

the transceiver is configured, by a base station, to receive a downlink transmission on a set of symbols in a slot and a set of resource blocks (RBs);

the processor is configured to detect a downlink control information (DCI) format, wherein the DCI format comprises at least one of the followings:

a first information that is used to indicate one or more slot formats;

a second information that is used to indicate the channel occupancy duration of the base station; or a third information that is used to indicate one or more RB sets availability for reception; and the processor is configured to determine whether to receive or cancel reception of the configured downlink transmission on the set of symbols in the slot and on the set of RBs based on a content of the DCI format and a detection result of the DCI format, wherein, in a case that the DCI format comprises at least one of the first information, the second information, and the third information, and the processor does not detect the DCI format providing a corresponding indication for the configured downlink transmission, the transceiver is configured to cancel the reception of the configured downlink transmission on the set of symbols in the slot and on the set of RBs; and in a case that the DCI format does not comprise at least one of the first information, the second information, and the third information, and the processor does not detect the DCI format providing a corresponding indication for the configured downlink transmission, the transceiver is configured to receive the configured downlink transmission.

9. The UE of claim 8, wherein the set of symbols in the slot are configured as flexible by one or more parameters, tdd-UL-DL-ConfigurationCommon and/or tdd-UL-DLConfigurationDedicated.

10. The UE of claim 8, wherein the transceiver is further configured to receive the configured downlink transmission on the set of symbols in the slot and on the set of RBs in a case that the DCI format comprises at least one of the first information, the second information, and the third information, and the processor detects the DCI format providing a corresponding indication for the configured downlink transmission.

11. The UE of claim 10, wherein the DCI format comprises a DCI format 2_0.

12. The UE of claim 8, wherein the DCI format comprises the first information, and the first information indicates the set of symbols as downlink;

the DCI format comprises the second information, and the second information indicates that the set of symbols are within the channel occupancy duration of the base station; and/or the DCI format comprises the third information, and the third information indicates that one or more RB sets, where the set of RBs are allocated in, are available for reception.

* * * * *